United States Patent [19]

Lewandowski

[11] 3,922,224

[45] Nov. 25, 1975

[54] APPARATUS FOR TREATING WASTE WATERS

[75] Inventor: Raymond Lewandowski, Rennes, France

[73] Assignee: Etudes et Procedes d'Assaomosse,emt, France

[22] Filed: Sept. 30, 1974

[21] Appl. No.: 510,404

Related U.S. Application Data

[63] Continuation of Ser. No. 346,410, March 30, 1973, abandoned.

[52] U.S. Cl. .............. 210/223; 210/243; 210/274; 210/50
[51] Int. Cl.² .............................................. B03C 1/30
[58] Field of Search ............ 210/42, 50, 45, 47, 49, 210/63, 274, 59, 243, 290, 222, 223, 293, 291; 75/109

[56] References Cited
UNITED STATES PATENTS

| | | | |
|---|---|---|---|
| 684,578 | 10/1901 | Merrill | 75/109 |
| 1,075,093 | 10/1913 | David | 75/109 |
| 1,323,588 | 12/1919 | Gordon | 75/109 |
| 1,963,893 | 6/1934 | Drowilly | 75/109 |
| 2,655,472 | 10/1953 | Hilliard et al. | 75/109 |
| 3,288,598 | 11/1966 | Hogue | 75/109 |
| 3,803,033 | 4/1974 | Sutherland | 210/59 |

*Primary Examiner*—Charles N. Hart
*Assistant Examiner*—Benoit Castel
*Attorney, Agent, or Firm*—Laff, Whitesel & Rockman

[57] ABSTRACT

An effluent passes through a bed of iron turnings, for example mixed with a certain quantity of sand, intended for the abrasion of the surfaces of the iron turnings. The sand and the turnings are agitated mechanically by a current of air bubbles. The effluent contains heavy metals which are separated and recovered in the form of metallic powder.

8 Claims, 7 Drawing Figures

APPARATUS FOR TREATING WASTE WATERS

This is a continuation of application Ser. No. 346,410, filed Mar. 30, 1973, and now abandoned.

The present invention relates to a method of treatment of waste waters of industry and more particular a method for separating and eventually recovering the ions of heavy metals. The invention likewise concerns an apparatus for treatment of waste waters, which apparatus is usable in accordance with this method.

In the following, reference will be made most frequently to the treatment of waste waters of an electroplating works and to the recovery of copper from effluents which contain copper sulphate. The method of the invention, however, is not limited to this application and may be utilized for separating and recovering copper from effluents of industries. For example, in printed circuit residues, industrial waste waters may contain copper from the engraving of plates of printed circuits. The method may furthermore be utilized to isolate other undesirable ions apart from or in addition to copper, possibly in the treatment of drinking waters when it is desired for example to eliminate mercury by a metallic colloid.

In fact, the elimination of the undesirable ions in waste waters is generally effected by precipitation or absorption. It is known, for example, to use ion exchanges to absorb selectively certain actions of strong affinity. Thus, French Pat. NO. 1,546,676 describes a method of treating waste waters by means (of a carboxylic exchanger of the type "duomite CCC") for the separation and the fixing of copper. These methods of ion exchangers are expensive and necessitate a supplementary operation for recovering the copper.

Waters charged with metallic salts may also be treated by precipitation. However, it should be noted that the curves of precipitation of usual metals in diluted aqueous environment extend over a wide range of pH so that it is practically impossible to precipitate all of them suitably in one single operation. In addition, the metals remain in the form of salts in the modes in which they are extracted from the decanter and are not recovered. On the contrary, these modes of hydroxides are generally disposed of in such a manner that they make their way into streams and rivers by the percolation of rain waters or in a trickling of underground streams, and the object of anti-pollution may be defeated.

An object of the present invention is to provide an apparatus for eliminating the undesirable ions in waste waters by chemical displacement so as to recover metals not in the form of salts but in the form of metallic cations precipitating in the form of pulverized metal.

According to the invention, the method utilized treatment materials which are cheap, as compared with the cost of conventional ion exchangers and freeing the toxic metals in pulverised form which is easily recoverable instead of in the form of pulverized salts which result from the precipitation method. This last advantage is very important when it is known that polluting metals, such as copper, tin etc., are expensive. It is of commercial importance to be able to utilize them again.

It should be noted here, the technology of treatment of effluents has already been used beds of metallic particles to eliminate compounds of toxic metals. Thus, U.S. Pat. No. 3,575,853 describes a method of precipitation to eliminate from an aqeuous environment, multi-valent toxic metals of the group of phosphates and toxic salts which contain a metal ion of the group of exavalent or trivalent chromium and zinc in the bivalent state, such elimination occurs by causing this aqueous environment, after having acidified it, to pass through a bed of iron or aluminum turnings. It must be understood however that, in the method of the U.S. Pat. No. 3,575,853, the metal of the particles is only utilised to supply a reducing agent adapted, for example, to reduce the hexavalent chromium which passes to the trivalent state. Likewise, U.S. Pat. No. 2,116,053 uses a bed of iron particles to generate in situ ferric chloride, with oxidation of the bed. The iron particles are preferably in the form of turnings.

When the metal of the particles is iron, an abrasive action within a sand bed agitated by air under pressure has the effect not only ensures a mechanical agitation, but also causes the ferrous ions on the occasion of displacement of copper, for example, to pass to the ferric ion state which are easily precipitable and in any case are non toxic.

In fact, if one utlizes iron or aluminum as treatment metal, all the toxic metals eliminated leaves in compensation beds of hydroxide of a single metal, Fe (OH), or Al (OH)$_3$ which is always the same. This enables a decanting and possible treatment of the modes in conditions which are practically invariable. In any case, because of the existence of these two hydroxides, risk of contamination of the underground waters is no more to be feared because they are very insoluble and are non toxic. In particular, the hydroxide is easily precipitable in a large range of pH from about 4 to 12.5 about (see the curves of FIG. 7). The hydroxide of aluminum is practically insoluble (between 6.7 pH and 7.8 pH of the polluted water) by organic materials.

On the contrary, according to the method of the invention, the bed of particles of the treatment metal acts by exchange of cations, by dissolving in aqueous environment whilst the toxic metal is deposited on the surface of the particles.

According to one preferred feature of the invention, in the course of the treatment, bubbling air subjects the bed of particles to an abrasive action intended to detach mechanically the toxic metal which is deposited on the surface of the particles.

According to another preferred feature of the invention, the abrasive action is produced by a suitable agitation of the bed of particles, which on the occasion of their impact scours one another mutually.

According to another preferred feature of the invention, the abrasive action is produced by a suitable agitation of sand mixed with the bed of particles. This abrasive action by the sand is used preferably with the particles.

According to another preferred feature of the invention, when the bed of metallic particles is formed, for example by aluminum or zinc, the surface of the particles is activated, before use or on starting the treatment, by an acid agent in the case where the metal of the particles is aluminum, zinc or tin, or by a basic agent in the case where the metal of the particles is aluminum or zinc.

These metals in fact oxidize easily and the coating formed by the oxide insulated the acting metal from the aqueous environment of reaction.

According to another preferred feature, when the bed of particles is formed by aluminum, for example, the surface is activated before use or on starting the treatment by traces of salts or mercury in an environment which may or may not be a acidic.

In fact, the mercury is displaced by the aluminum and is deposited on it forming an amalgam. As the aluminum is greatly in excess, there is practically no risk that the mercury added to the plate of traces will contaminate the effluents treated.

According to another preferred feature, the metal or the mixture of metals of the bed of particles may be activated by an electro-chemical action, causing a continuous current polarized to form a cathode, to pass into the said bed of particles.

According to another preferred feature, when the bed of particles is formed by iron, an oxidizer such as Javel water may be added to the aqueous environment, monope sulphuric acid, etc., to accelerate passage of the ion from the state of ferrous ions to the state of ferric ions. This addition of oxidizer may, for example, be utilized along with oxygen of the air mentioned above and acting as mechanical agitator and as oxidizer in the case of points of pollution.

Summing up, it appears that one of the methods of treatment of industrial effluents intended for separating, by mechanical displacement, heavy metals consists according to the invention in causing the effluent to pass through a bed of iron turnings, for example, mixed with a certain quantity of sand, intended for the abrasion of the surfaces of the iron turnings, the sand the turnings being agitated mechanically by a current of air bubbles, the air transforming likewise the ferrous ions into ferric ions which are easily precipitable, so that the heavy metals to be separated can be recovered in the form of metallic powder.

It must be understood that the reaction of displacement of the heavy metal by iron or aluminum takes place practically at the surface of the particles of iron or aluminum where an ion of heavy metal may meet an atom of iron or aluminum. In the course of a single passage through the bed of particles, even if the volume of the bed is considerable, the probability of one heavy ion meeting an iron atom or an aluminum atom is not equal to one. That is why, according to the invention, the method of the invention, provides an apparatus for recycling the effluents through the bed of particles.

According to one preferred feature of the invention, there is provided an apparatus for the treatment of industrial effluents including heavy metals in the state of salts. The apparatus has a basin in which there are a reaction zone and a decanting zone. The zones are separated by partitions. The reaction zone comprises from top to bottom, a bed of particles of treatment metal resting on a perforated bed plate disposed above air blowing ramps. The height of the partition are such that the level of the aqueous environment, in the reaction zone when the air is blown, is slightly above the upper edge of the said partitions. The overflow of the aqueous environment of the reaction zone discharges into the decantation zone. This overflow comprises in addition, liquid of the modes of heavy metals displaced, and possibly particles of the treatment metal. The partitions have at their lower parts openings for the return of the decanted liquid and of possible suspensions from the decantationzone to the reaction zone.

According to another preferred feature, the bed comprises a certain quantity of sand. The grains of sand are projected against the surface of the particles by the mechanical agitation brought about by bubbles of air blown therethrough. A part of the grains of sand are possibly brought along with the overflow towards the decantation zone, in which the grains fall to the bottom to enter again the reaction zone through the openings of the partitions.

According to another preferred feature of the invention, an inert cathode in the aqueous environment of the reaction is disposed substantially horizontally in the lower part of the said bed of particles, and an anode likewise inert is disposed below the said bed, also substantially horizontally and slightly below the free surface of the aqueous environment in the reaction zone. The cathode is in contact with the metallic mass of the bed. The anode is connected in a suitable manner to provide a source of continuous current.

According to another preferred feature, the aqueous environment to be treated is introduced into the apparatus, which is of general elongated shape. This introduction is at one end of the apparatus and in the vicinity of air blowing ramps. The aqueous environment is treated by pouring off, for example, through a siphon partition disposed at the other end of the apparatus in the decanting zone. The air blowing ramps, the cathode, the electrode and the supporting base plate of the bed of particles are disposed along the full length of the reaction zone.

According to another preferred feature the syphon partition is provided with an electromagnet which is energized to attract the particles of iron which would be brought along out of the apparatus with the treated effluents. The energization of the electromagnet is cut off regular intervals and during relatively short periods of time to allow the particles of iron to fall to the bottom of the decanting zone, which thus regains the bed of particles in the reaction zone.

According to another preferred feature, the treatment apparatus is followed by a first conventional decanting basin in which the separated heavy metals are recovered, and a second decanting basin in which the hydroxide of the treatment metal is precipitated.

According to another preferred feature, there is provided upstream of the treatment apparatus a reserve of oxidizing liquid such as for example Javel water which is mixed with the effluent to be treated before the admission of the mixture into the apparatus.

According to another preferred feature of the invention, at a place where the aqueous environment to be treated is concentrated a recycling branch of the liquid is provided with a second decanting basin near the inlet of the treatment apparatus. The recycling branch is closed and the liquid of the second basis is evacuated, possibly toward a second treatment apparatus, when the concentration of ions or heavy metals has reached a minimum predetermined value.

Until now, only the separation and the elimination of the cations of heavy toxic metals in industrial effluents has been considered. It has, however, become apparent that secondary reactions may be obtained with the associated anions or even with other non ionic compounds. In particular, the fixing of a cation permits a freeing of certain simple anion groups previously in the form of complexes. Thus the chromate and acid effluents, for example, may be admitted into the treatment apparatus and subjected to the method at certain concentrations.

The reduction of hexavalent chromium is rapid, either by the nasent hydrogen or by the iron of the treatment metal and which appears always in its ionic form, which is the least oxidized. The cyanide effluents may likewise be admitted into the apparatus at certain concentrations. If the treatment metal is iron, the ferrous salts are in constant formation in the bed of particles and they immediately take part in the decyanidation in a conventional manner. If the treatment metal is aluminum, nascent hydrogen in the basic environment transforms the cyanhydric acid into methylamine, for example. It may likewise be noted that the bed of particles serves also as a very economic neutralizing agent.

The secondary properties being indicated above, it is important to note that the apparatus according to the invention may, following a conventional chromiumisation or a decyanidation serve as final or safety measure as the apparatus is capable (within certain limits) of absorbing the accidental particles which might escape the de-toxifications effected upstream.

The precipitated salts of the treatment metals may likewise absorb other anions such as those of fluorides or organic products in the measure where their concentrations do not reach the base of passivation of the treatment metal.

It must also be noted that the solution of aluminumm salts formed, if the bed of particles is in aluminum, may serve as conventional coagulent of the agent at another stage of the treatment, if that should turn out to be necessary.

In an acid environment, the use of a bed of iron particles has been explained above. Also, it permits a detoxifying of certain organic compounds possibly present in the aqueous environment to be treated. Thus the toxic nitrated nurivatives, may be reduced to the state of non-toxic annime. The masent hydrogen created at the surface of the aluminum in basic environment has the same detoxifying effect.

Other advantages and features of the present invention will appear more clearly on reading the following description of examples of putting into effect the methods and realization of apparatus, the said description being made in relation to the attached drawings in which.

Figure 1:
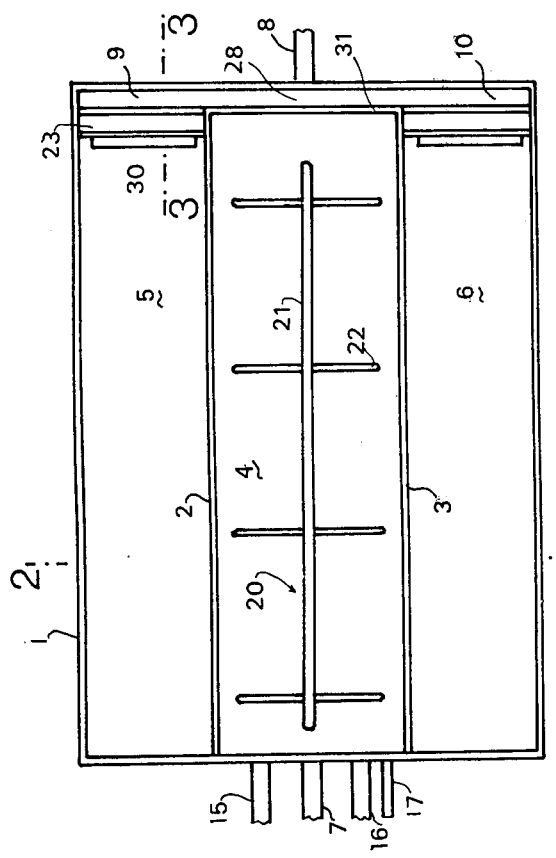
FIG. 1 is a view from above of an apparatus for treatment of effluents according to the invention.
Figure 2:
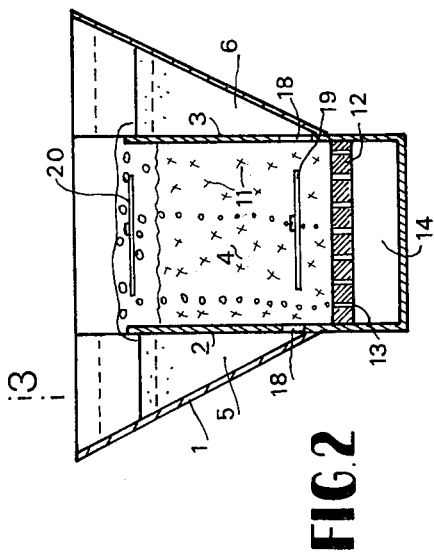
FIG. 2 is a cross section of the apparatus of FIG. 1.

The apparatus of FIG. 1 comprises a vat 1 of material not corrodible by the aqueous environment which it has to contain. For example the vat may be made of cement. The cross section shape of the vat is generally trapezoidal, with the small base at bottom, as FIG. 2 shows. Inside the vat 1, two vertical partitions 2 and 3 define a central reaction zone 4 and two decantation zones 5 and 6. The vat is relatively longer than wide. The effluents to be treated enter into the vat through pipe 7 at one end and leave at the other end through a pipe 8, through which the fluids collected by the discharge parts 9 and 10 are discharged.

The reaction zone 4 is filled with a bed of metal particles 11 resting on a base plate 12 pierced with vertical holes or openings 13. The bed of particles is not shown in FIG. 1, in order to render the figure more clear. The opening of the pipe 7 is above the level of the base plate which defines a lower space 14 into which feeds two air inlet tubes 15 and 16, the air occupying the whole space 14. Likewise, there is a tube 17 for feeding an oxidizing liquid which also emerges above the base plate 12.

The bed of particles 11 is formed for example by machining residues such as iron turnings which are almost always found at a place near electro-plating works. The particles 11 are mixed with sand in a suitable proportion. In operation, when the stationary condition is attained, the sand is practically uniformly spread out in the mass of the bed of particles 11. In fact, the bubbles passing through the holes 13 of the base plate 12 create a current of ascending liquid in the reaction zone which somewhat agitates the particles 11 but in particular displaces the grains of sand and agitates the whole mass. A satisfactory distribution of the sand in the mass may be obtained by selecting grains of granular size variation between two limits. In regulating the supply of air in the pipes 15 and 16, one may also act on this distribution.

The two partitions 2 and 3 of material not corrodible by the environment to be treated, have a height such that part of the liquid of the reaction zone is discharged into the decantation zones 5 and 6, which permits of having four ascending currents of liquid. The partitions 2 and 3 are pierced at their lower parts with openings 18 distributed over the whole length of the vat 1 and two of which are visible in FIG. 2. These openings permit the charge liquid from the bottom of the decantation zone to return to the reaction zone. Instead of allowing the overflow to be effected above the partitions there may likewise be arranged openings above the partitions. The partitions 2 and 3 could be oblique instead of vertical. Deflectors may be provided at the bottom of the zone 4 to prevent the air from escaping through the openings and to accelerate the return current of the liquid from the zones 5 and 6 to the reaction zone 4.

The bottom of the bed of particles 11 is traversed by a longitudinal non-corrodible cathode 19. The longitudinal anode 20 is installed above the bed and below the level of the liquid in zone 4. The cathode 19 and the anode 20 are respectively connected to the negative and positive poles of a voltage source. The anode and cathode may each be constituted by a central rod 21 provided with horizontal branches 22 as shown in FIG. 1.

Figure 3:
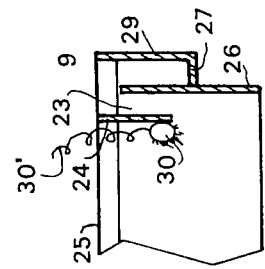
FIG. 3 is a longitudinal section of the apparatus of FIG. 1 taken on the line 3—3 indicated in FIG. 1.

FIG. 3 is a view in the section on the line 3—3 of FIGS. 1 and 2 of the right hand part of the decantation zone 5 and the air partition permitting the flow of the effluent treated in the space 9. The syphon partition 23 is formed by a transverse plate 24 suspended at the upper edge 25 of the vat 1 across the decanting zone 5. The lower end of the plate 24, is preferably 5 to 10 cm below the level of the liquid in the decanting zone 5. A plate 26 forms a part of the transverse side of the vat 1, and the upper end of which is slightly (1 or 2 cm) below the level of the liquid. The space 9 is defined by a base 27 inclined to the inlet 28 of the discharge pipe 8, the other face of the plate 26 and a transverse wall 29, the upper edge of which is at the same level as edge 25.

The plate 24 carries the armature of an electromagnet which serves to detain the particles of iron which might otherwise escape from the bed 11 and which would be evacuated like the treated liquid in the direction of the arrow F. The electro-magnet is normally fed with electric current, for example, by the wire 30. From time to time, this feed of current is cut off. Particles then fall to the bottom of the zones 5 and 6 where they may be returned into the reaction zone 4 through the openings 13. It should be noted that the edge 31 of the reaction zone 4 is obviously at the same level as the edge 25. The space 10 and the corresponding syphon particles are symmetrical with 9 and 23.

Treatment of a solution of sulphate of copper introduced into the vat 1 through the pipe 7 will now be described. This solution mounts in the reaction zone 4 because it is brought along by sending a current caused by the air bubbles in the bed of particles 11 mixed with sand. A displacement of the copper ion by the iron takes places at the surface of the particles 11. The iron of the reaction passes to the ferrous iron state whilst the copper metal is deposited on the surface of the particles 11. This latter is subjected to a bombardment of grains of sand. The copper metal is detached and is found again in pulverant form in the solution while a new surface of iron is exposed to displace other copper ions. The copper pulverant metal is subject to an ascending movement in the reaction zone 4 and is discharged above the edges of the partitions 2 and 3 in the decanting zones 5 and 6, where it tends to descend.

The air which floods the space 14 agitates the liquid and creates an ascending movement. Also it oxidizes the ferrous ions of the solution which pass to the ferric ion state. Precipitation in this state is much easier when it is in an acid environment. Thus, the solution rapidly takes on the well known rusty shade of ferric hydroxide. Likewise a portion of the sand passes into the decanting zones 5 and 6, and with the discharge, it falls rapidly to the bottoms of these zones and enters the zone 4 through the openings 18. It is obvious that a part of the pulverant copper and some fine particles of iron pulled away by abrasion follow the same path as these small grains of sand. Then, they again cross the reaction zone 4 and the particles of iron participate in the displacement reaction of the copper. Likewise, a portion of fine particles of iron remain in suspension in the decanting zone like the pulverant copper, but cannot escape with the treated liquid because it will be arrested by the electromagnet 30.

The solution to be treated enters at the end of the vat 1 through the pipe 7. When evacuated at the other end through the spaces 9 and 10, the solution is actuated in the vat by symmetrical, helical movements about the longitudinal axis.

Pipe 17 enables an ejection into the reaction zone 4 oxidizing the agent, which ejection accelerates the passage of ferrous iron to ferric iron. Likewise, there is an acceleration of the reaction following from the left to the right since the ferrous iron at the right disappears rapidly.

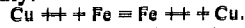

To practice the introduction of oxidizing the agents (such as Javel water) will only be necessary at points of pollution (that is to say) when the concentration if ions Cu ++ exceeds certain predetermined limits). For this purpose, the anode 20 and the cathode 19 are provided in contact with the particles 11 so that a continuous electric current passes between the anode and cathode and causes the rapid deposit of copper on the particles.

Figure 4:
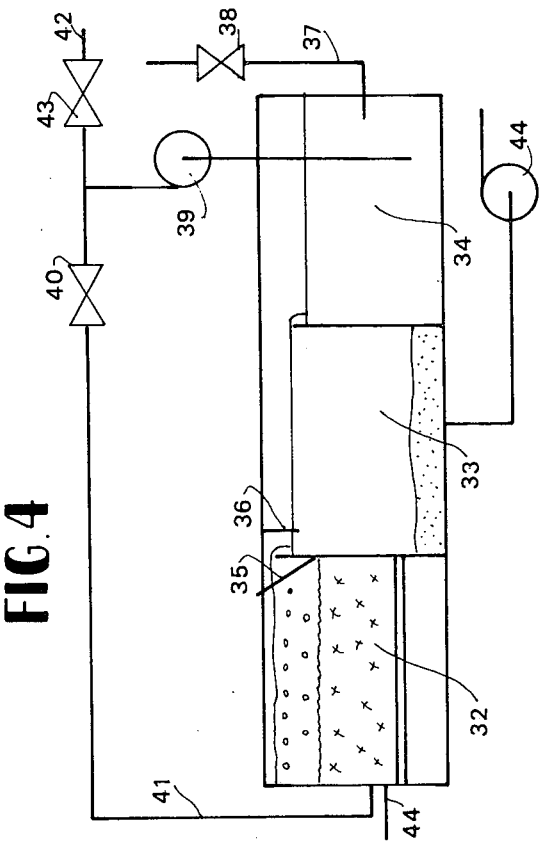
FIG. 4 shows diagrammatically a longitudinal section a treatment apparatus according to the invention particularly intended for the treatment of concentrated bath.

FIG. 4 shows an embodiment of a treatment apparatus according to the invention which is particularly intended for the treatment of concentrated bath or baths of hexavalent chromium compounds or also baths containing cyanides. The apparatus comprises a first vat 32 which may be similar to that of FIG. 7, except possibly in the system of evacuation of the treated liquid which may be simplified. A second vat 33 is used for a decanting or a precipitation to separate the heavy metals. A third vat 34 is used for stocking the concentrated environment before recycling. The system of providing a from the vat 32 to the vat 33 comprises simply an arresting grill 35 for the activated particles 11 and a deflecting partition 36.

The concentrated polluted environments are admitted through pipe 37, through the valve 38, and into the stocking basin 34. When the liquid in vat 34 has reached a certain level, the valve 38 is closed and the pump 39 draws the environment to be treated from the stocking vat 34 and delivers it to the treatment vat 32 through the valve 40 the pipe 41. The pump 39 also serves to evacuate the contents of the vat 34 to the outlet pipe 42 through the valve 43, when desired. Another pump 44 permits the decanted modes in the vat, if a method of decanting is utilized. A pipe 45 permits the introduction of possibly an oxidizing agent into the vat 32.

The operation of the apparatus of FIG. 4 will now be described. The valve 38 is opened to admit the polluted effluent into the vat 34. Then it is delivered to vat 32 where it is subject to the same treatment as in the apparatus of FIG. 1 with additional secondary reactions which will be better understood on reading the following examples of chromatated or cyanised bath, the heavy pulverant metal being discharged with the liquid into the vat 33 where it is decanted. Clear liquid (that is to say no longer containing any significant amounts of solids) passes from the vat 33 to the vat 34 where it is stocked. This also clearly contains soluble polluting compounds. That is why it is subjected to a recycling after having been pumped by 39 and discharged into 32 to the open valve 40. After having undergone several recyclings, the degree of pollution of the liquid in the vat 32 falls below a predetermined level. The degree of pollution is for example measured by a reading of well known measuring apparatus. The valve 40 is then closed while the valve 42 is opened, which enables the pump to force the liquid treated into the evacuation pipe 42. This pipe 42 may lead to another apparatus of the type of FIG. 1 as will be seen later.

In practice, in the treatment of a concentrated bath beds of particles of aluminum will be used instead of particles of iron, when necessary or when residues of aluminum instead of iron turnings are available. However, when aluminum is utilized, the aluminum formed by oxidation must not coat the surface of the particles. For this reason, air is used to provide mechanical agitation. Instead of oxidizing agents, chemical agents will be added, for example, through the pipe 45, for activation of the aluminum, examples of which will be seen later. Likewise, this activation of the aluminum may be realized in establishing, in a continuous manner, a current between the electrodes 19 and 20 (and not occasionally as stated above).

Figure 5:
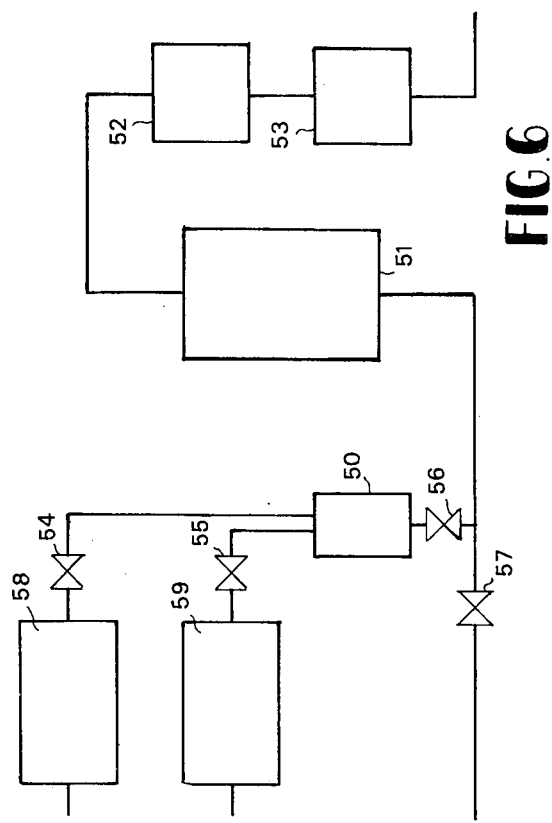
FIG. 5 is a diagrammatic view of a variation of the apparatus of FIG. 1.

FIG. 5 shows diagrammatically a variation of the apparatus of FIG. 1. This variation comprises a vat 46 having an inverted truncated triangular cross section, inside of which is installed a recycling enclosure limited by wall 47 at the base of which is located a raising means such as a conveying worm 48 and below which air is introduced through pipes 49. The effluent to be treated is, for example, the same as that of FIGS. 1 and 4. However, the particles of treatment metal are here in much more finely divided form and are not in the form of turnings. Thus, they accompany the effluent in its displacement first to the top of the inside wall 47 then to the bottom of the outside wall. In this embodiment, the surface of the particles, which tend to be covered with heavy metal, is scoured when the particles are encountered, especially when passing in the vicinity of the conveying worm, and activation agents, as has been stated above are used.

Figure 6:
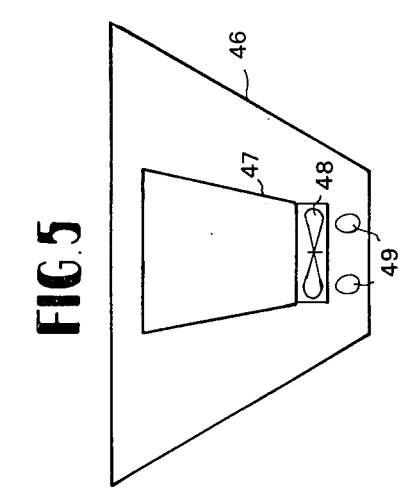
FIG. 6 shows the installation scheme of complete treatment comprising the apparatus according to the invention.

FIG. 6 shows diagramatically a complete installation in which the preferred unit is a treatment apparatus, according to the invention. It comprises two apparatus intended for treating a concentrated bath 58, for the bath containing concentrated acid compounds. The other apparatus 59 is for treating the basic bath containing cyanides. These apparatus are similar to part of FIG. 4 with re-cycling, a conventional neutralizing basin 50 for chromium compound, the cyanisation apparatus 51 of the type similar to that of FIG. 1 and 2, and detention or floatation basins 52 and 52.

The effluents treated in the apparatus 58 in an acid environment, pass, when the valve 54 is open, into the basin 50 in which a base is added to bring the environment to an admissible pH at the entry of apparatus 51. For the effluents treated in the apparatus 59 an acid is added in basin 50, at the passage through the valve 55. The valves 54 and 55 may be opened together, their effluents neutralizing in basin 50 which permits an induction of the base or acid deposits. The effluents leaving basin 50 are admitted through the valve 56 into the apparatus 51. The non-concentrated industrial effluents are admitted into the apparatus 51 and through the valve 57. For reasons of safety, these effluents are conveyed through basin 50, if a neutralization, is imposed. At the outlet of 52, the heavy metals may be recovered and at the outlet of 53 the purified effluents are rejected. In the basin 53, the hydroxides of iron or aluminum are easily precipitated.

Several examples of how polluted effluents may be treated according to the method of the invention will now be described.

EXAMPLE 1

Figure 7:
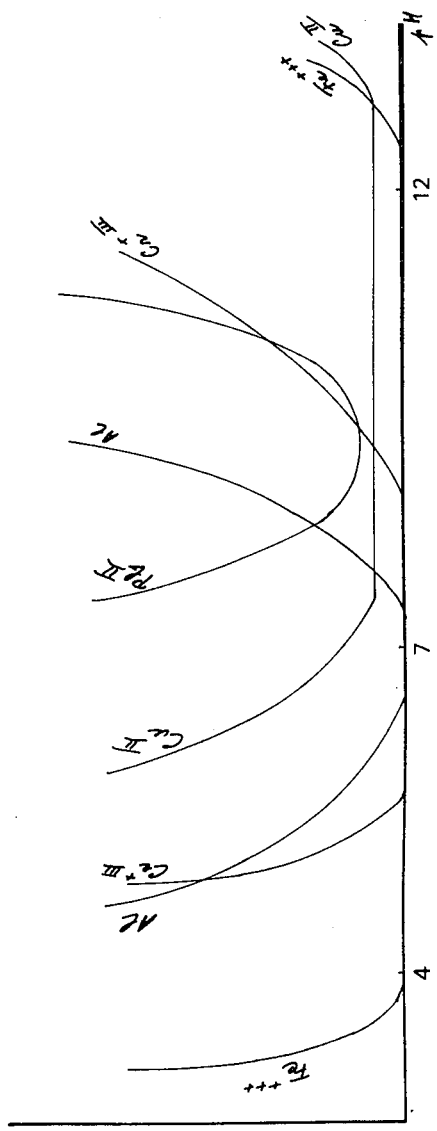
FIG. 7 shows the degrees of precipitation of the metals in diluted aqueous environment according to pH.

A solution or copper salt, the pH of which is 6.0 to 6.2 having a content of Cu ++ of 12 to 15 is fed into the apparatus of FIG. 1 through the pipe 7. The content of residual copper, in the case of a relatively rapid passage, on the particles of iron in the form of turnings is at the lower outlet 150 micrograms, per liter. The clarified water is strictly free of iron. In fact, according to one of the features of the invention one has on one hand displaced the copper and on the other hand replaced the curve of precipitation of Cu ++ by the curve of precipitation of Fe +++ which, as seen in FIG. 7, is much more spread as a function of pH.

EXAMPLE 2

Scraps of aluminum are put into contact with a bath of concentrated copper sulphate. The resulting blue liquor becomes discolored slowly. The aluminum corrodes while the red pulverent copper is released from the aluminum in favor of a light gaseous release. At the end of the reaction, the solution includes aluminum sulphate and is free of copper. This solution may be used advantageously as a flocculant at a later stage of the treatment. If these scraps of aluminum are very old, it suffices to pass their surfaces, by causing to pass into the mass a cathode current to facilitate the starting of the reaction which then follows spontaneously.

The lowering of the pH accelerates the speed of reaction. This acidity is then neutralized by the aluminum always in excess up to a blocking value of pH.

EXAMPLE 3

The steps of example 2 are carried out with pieces of aluminum activated chemically, for example, previously by putting in a light acid solution containing traces of mercury salts.

It is then possible to introduce the sulphate of copper in a solid form in the reactional environment which shows that the concentration in copper is a matter of indifference. The red and pungent metallic copper appears almost instantaneously. The exolhermicating of the reaction, permits an introduction of residual quantities of solid copper salt, the practical limit of reaction being determined by the viscosity of the solution of aluminum sulphate. The output exceeds 99%.

This treatment is particularly appropriate for a bath of copper acid and the bath neutralized by alkalizing of the copper. If the pH of the reactional environment is very low, the copper will be recovered in the form of plates, whilst it is obtained in the form of powder, if the pH is much higher.

The same experience has been obtained with salts of nickel which are obtained in the form of fine spray flakes with very low pH and in the form of black pulverant nickel with the pH higher.

The cobalt salts give the same metallic cobalt. The salts of mercury, if they are not too diluted, deposit droplets which attach to the aluminum. A considerable deposit of the mercury salts is necessary for the metal to become detached in the form of brilliant particles. The reaction is spontaneous with lead salts. The bath of fluorate of tin and of lead allow the depositing of rather brilliant fibrilles formed of tin and lead.

EXAMPLE 4

A concentrating copperammoniae liquor is treated by the activated aluminum copper deposits with a red draw on the black. This method is suitable for a bath of alkaline bathing of copper.

EXAMPLE 5

A bath of cadmium with cyanide is injected into the treatment vat lined with activated aluminum. In conventional manner, this bath is decyanized in the reactional environment maintained under agitation for example, by injecting Javel water and soda to maintain the pH above 11.5.

Immediately, cadmium appears in the form of spongy foam very easily separate. The very fine particles of treatment metal which it may carry away, stabilize the more noble metallic modes which are subsequently recovered. The reactional mixture thus acts simultaneously and in the same environment on the anion and the cation both very toxic of the salt of the bath.

EXAMPLE 6

After having noted that in the experience of for example 5 of Javel water is missing, the aluminum would continue the reaction of de-cyanisation, one has cause to react the metallic complex cyanide such as those of zinc, of cadmium and even gold, with activated aluminum and a precipitation of the metals corresponding to the activation having taken place in alkaline environment. In fact, in alkaline environment, the aluminum produces nascent hydrogen which reduces the cyanides into anine products, the methylamine of which disengages. And as for example the reaction NCN + 2 H₂ (Nascent) CH₃ - NH₂.

Now, the methylamine is not at all toxic. On the contrary cyanates are obtained in the de-cyanisation effected by the Javel water.

EXAMPLE 7

A mixture of salts of palladium and tin is treated by the activated aluminum. A spongy form of palladium tin is obtained.

Likewise, in causing a diluted solution of salts of tin and of palladium to pass on a cartridge filled with tin in powder form, one may recover selectively the palladium while the ionic tin does not react.

EXAMPLE 8

With a method according to the invention, a metal may be displayed even if it is an ionic form. A bath of plohmbite (lead) of sodium prepared from lead nitrate is traversed through a bed of aluminum particles. Metallic lead appears immediately and agglomorates very quickly into spongy mass. The soda in excess pass the aluminum freeing the nascent hydrogen which reduces the ion nitrate into ammoniac which disengages. The lead and the nitrate ion are eliminated from the environment. The purified water, after neutralization, no longer contains the salt of sodium of the neutralizing acid but contains, for example, the totally inoffensive chloride of sodium. The method permits therefore additionally the elimination of dissolved azote. It must be noted that the particles which are added to the reaction vat, as the treatment metal disappears, must be admitted directly in the form of nondegreased turnings. In the bath, the hydroxide of iron for example is par excellence the oiling agent and air permits of universally demounting the flock thus formed. The deoiling is likewise realized mechanically by the sand.

Although the principles of the present invention are described above in relation to particular examples of putting into operation, it must be understood that the said description has been made only by way of example and does not limit the extent of the invention.

What I claim is:

1. A water treatment bed of particles for removing waste metals in ionic form from industrial effluents, said waste metals being taken from the class of metals including copper, cadmium, palladium, lead, and tin, said bed comprising from top to bottom a mixture of sand and metallic particles resting upon a perforated bed plate mounted above a continuously pressurized gas compartment, said metallic particles being taken from the class of metals including iron, aluminum, and zinc, said particles having a higher electromotive voltage than said waste metals whereby said waste metals tend to attach themselves to the particles of higher electromotive voltages, means for applying current from an electric DC source to form said bed into a cathode, whereby electric current flowing through the bed causes an electro-chemical action for preventing the surfaces of said particles from oxidizing, means for continuously blowing said gas from said gas compartment and into said bed via said perforations, whereby said bed is adapted to enable a continuous passage of a gas from said compartment, through the perforations in said bed plate, up into and through said mixtures, means for adjusting the flow of said gas to continuously bubble said gas through said bed plate and up into said mixture of sand and particles with a force which continuously agitates the sand and particles sufficiently to produce an abrasive action between the sand and metal particles which abrasion detaches the waste metals from said particles, and effluent conveying means comprising an entrance and exit for continuously directing an effluent containing said waste metal through said bed along a path through the gas which bubbles up through said mixture, whereby said effluent is treated while it is in and passes through said bed.

2. The water treatment bed of metal particles of claim 1 wherein the metallic particles are limited to metals in the class of aluminum and zinc.

3. The water treatment bed of claim 1 and basin means composed of a reaction zone and a decanting zone separated from each other by at least one partition, the reaction zone comprising said bed resting on said perforated bed plate and disposed above said gas compartment, said partition having a height slightly less than the height of the effluent in said reaction zone so that the reaction zone effluent is discharged over the upper edge of the partitions and into the said lower portion for returning the decanted effluent into the said reaction zone.

4. The water treatment bed of claim 1 wherein said particles include iron or other magnetic material, and electromagnet means at said exit, means for normally energizing said electromagnet to separate particles of iron carried along with the treated effluents, and means for deenergizing the electro-magnet at regular intervals and during relatively short periods to cause said separated particles of iron to drop to a bottom zone.

5. The water treatment bed of claim 1 wherein said bed comprises an effluent recycling branch means for conveying the liquid of the treated effluents from the said exit, means at said exit forming a basin, said branch extending from the exit to the effluent entrance of a main reaction zone, means for closing the said recycling branch and directing the effluent towards a second treatment basin when the liquid being treated includes a predetermined concentration of heavy ions.

6. The water treatment bed of claim 5 wherein the metallic particles are limited to metals in the class of aluminum and zinc, the said bed further containing at least some salts of mercury in sufficient quantity to at least partially prevent oxidation of surfaces of said particles.

7. The water treatment bed of claim 1 wherein the bed is in an elongated vat, and said entrance means comprises means for introducing the effluent to be treated into a reaction zone at one end of said elongated vat, means for evacuating the effluent by pouring it off through a siphon partition disposed at the other end of the elongated vat and into a decanting zone, said reaction zone comprising the compartment for blowing said gas, said electrical cathode, an anode, and the perforated bed plate extending throughout the entire length of the reaction zone.

8. The water treatment bed of claim 7 wherein said particles include iron or other magnetic material, said siphon partition includes an electro-magnet means for use when the treatment material includes particles of iron or other magnetic type of material, the said electro-magnet serving to separate the particles of iron from the bed as they are carried along with the treated effluents, and means for deenergizing the electro-magnet at regular intervals and during relatively short periods to allow particles of iron contained therein to drop to the bottom of the decanting zone.

* * * * *

UNITED STATES PATENT AND TRADEMARK OFFICE
CERTIFICATE OF CORRECTION

PATENT NO. : 3,922,224
DATED : November 25, 1975
INVENTOR(S) : Raymond Lewandowski It is certified that error appears in the above-identified patent and that said Letters Patent are hereby corrected as shown below:

Title Page, show applicant is entitled to priority date of March 31, 1972 based on French application 72 12191; same page, correct the name of Assignee to read as follows --Etudes et procédés d'assainissement Purator EPAP, Société Anonyme--; Col. 2, line 21, change "utlizes" to --utilizes--; line 23, change "(OH)" to --$(OH)_3$--; col. 4, line 49, change "basis" to --basin--; col. 5, line 21, change "aluminumm" to --aluminum--; col. 7, line 7, change "13" to --18--; col. 7, line 10, change "particles" to --partition--; col. 7, line 17, change "places" to --place--; col. 7, line 61, change "if" to --of--; col. 8, line 4, change "7" to --1--; col. 8, line 9, after "a" insert --flow--.

Signed and Sealed this eleventh Day of May 1976

[SEAL]

Attest:

RUTH C. MASON
Attesting Officer

C. MARSHALL DANN
Commissioner of Patents and Trademarks